J. LAFITEAU.
HORSE-POWER.
No. 176,014. Patented April 11, 1876.
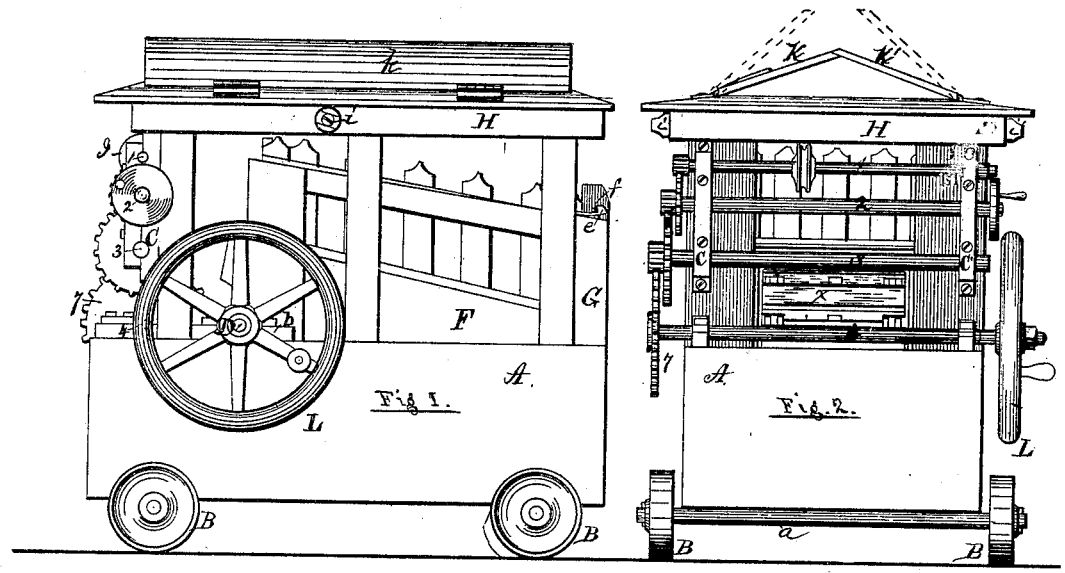
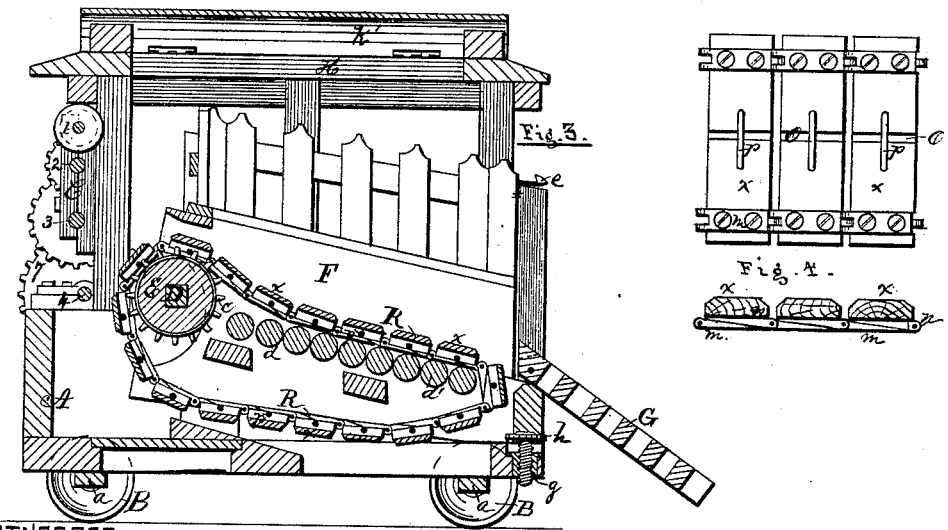
WITNESSES.
A. E. Dupas
H. N. Jenkins
INVENTOR.
Jean Lafiteau

UNITED STATES PATENT OFFICE.

JEAN LAFITEAU, OF NEW ORLEANS, LOUISIANA.

IMPROVEMENT IN HORSE-POWERS.

Specification forming part of Letters Patent No. 176,014, dated April 11, 1876; application filed February 12, 1876.

*To all whom it may concern:*

Be it known that I, JEAN LAFITEAU, a resident of the city of New Orleans and State of Louisiana, have invented a certain new and useful Improvement in Horse-Powers; and I do hereby declare the following to be a full, clear, and correct description of the same, reference being had to the annexed drawing, making a part of this specification.

The object of my invention is to provide a horse-power which can, without difficulty, be transported from place to place by the same animal with which its machinery is operated, thereby making it especially desirable for the use of farmers, and, in fact, for all persons requiring a cheap, durable, and transportable motive power.

The peculiar features of my invention will be readily understood by reference to the drawing, in which Figure 1 represents a side elevation; Fig. 2 an end elevation, and Fig. 3 a longitudinal section thereof. Fig. 4 shows a portion of the endless carrier or traveling tramway, to which motion is imparted by the feet of the animal as he in vain tries to move forward over the same.

A represents the frame of the machine, which is mounted upon wheels B B, which operate loosely on the ends of the axles $a$ $a$, that are secured to the bottom of the aforesaid frame A. To the front uprights of this frame are secured journal-boxes C C' for the reception of the journals of the horizontal shafts 1 2 3 4, all of which are provided on their rear ends with gear-wheels, as shown. D is the main shaft. Its journal-bearings are secured to the side pieces of the frame, as shown at $b$. To this shaft is keyed or otherwise secured a drum, E, the center of which is provided with a chain-wheel, $c$, over which operates the movable tramway R. That portion of the tramway upon which the animal acts is supported by means of the friction-rollers $d$ $d'$, &c. The ends of the latter are journaled in the sides of a pen, F, that is placed inside of the main frame. The rear of this pen is provided with a hinged gate, G, which, when lowered, serves as an apron upon which the animal may walk to reach its working position upon the tramway, after which the gate is designed to be raised and fastened by means of the catches $e$ $e$ and pin $f$. The rear of the frame A is provided with a nut, $g$, and screw $h$. Upon the head of the latter rests the rear end of the pen F, so that the raising or lowering of this screw alters the incline of that portion of the tramway upon which the animal operates, and thereby regulates the speed of the machine, the motion of which may be entirely arrested by raising the screw $h$ to a height sufficient to bring the upper side of the tramway in a horizontal position. To the top of the frame A is secured, by means of screws $i$ $i$, a cover, H, provided with hinged lids $k$ $k'$, which may be either opened or closed, according to the state of the weather and the location in which the machine is being operated.

The tramway R is composed of slats $x$, that are connected near their ends with links $m$ $n$, as shown. Through the center of the slats, and parallel with the chains thereof, is constructed a groove or channel, $o$, and each slat is provided with an iron bridge or staple, $p$, which, when the tramway is set in motion, engages the teeth of the wheel $c$, and, through its shaft D and cog-wheel, (that is secured to the rear end thereof,) the motion is imparted to the pinion 7 of shaft 4, and from thence, through a train of wheels, to the upper shaft 1, from which the motion may be transmitted from the pulley I in the usual manner.

To give steadiness of motion, as well as to assist in the start of the machine, the main shaft is provided with a fly-wheel, L.

If desired, a brake-shoe may be made to act upon the periphery of the fly-wheel, but this is not deemed necessary, inasmuch as the screw $h$ is designed to accomplish the same purpose.

What I claim as new, and desire to secure by Letters Patent, is—

1. The frame A, provided with wheels B B, shaft D, drum E, chain-wheel $c$, and tramway R, in combination with the pen F, provided with gate G and rollers $d$, for the purpose set forth.

2. The arrangement of the nut $g$ and screw $h$, for the purpose set forth.

3. The cover H, provided with lids $k$ $k'$, in combination with the frame A and pen F, as described and for the purpose specified.

This specification signed this 14th day of October, 1875.

JEAN LAFITEAU.

Witnesses:
A. E. DUPAS,
H. N. JENKINS.